D. MILLS & A. J. IRVINE.
MEANS FOR SEPARATING WATER FROM STEAM IN STEAM BOILERS.
APPLICATION FILED NOV. 4, 1907.

952,831.

Patented Mar. 22, 1910.

Witnesses:
F. Ovendale.
A. Thompson

Inventors:
David Mills
Archibald John Irvine
by Chas. Ovendale
Attorney

UNITED STATES PATENT OFFICE.

DAVID MILLS AND ARCHIBALD JOHN IRVINE, OF JOHANNESBURG, TRANSVAAL.

MEANS FOR SEPARATING WATER FROM STEAM IN STEAM-BOILERS.

952,831. Specification of Letters Patent. Patented Mar. 22, 1910.

Application filed November 4, 1907. Serial No. 400,723.

*To all whom it may concern:*

Be it known that we, DAVID MILLS and ARCHIBALD JOHN IRVINE, subjects of the King of Great Britain, and residing at Johannesburg, Transvaal, have invented certain new and useful Improvements in Means for Separating Water from Steam in Steam-Boilers, of which the following is a specification.

This invention relates to means or apparatus for separating the entrained moisture or water from steam in steam boilers.

The objects of the present improvements are, firstly, to increase the efficiency of the apparatus by providing means for more effectually preventing the passage of the entrained water with the steam into the separating vessels, secondly, to simplify and improve the design of such apparatus with a view to reducing the cost of manufacture, and thirdly, to construct the apparatus so as to reduce the work necessary in fitting the apparatus inside the steam space of the boiler.

To the accomplishment of these ends our present improvements consist in interposing in the passages in the vessel through which the steam passes from the steam space of the boiler to the steam outlet pipe, a piece or pieces (preferably in the form of a roll or coil) of copper or other suitable metal wire gauze of uniform or graduated mesh, so that the steam is compelled to pass through the meshes or interstices of the gauze and the entrained moisture deposited thereupon before the steam enters the vessel in its passage to the steam outlet. The vessel is also preferably constructed to form a chamber or space below the wire gauze into which the entrained moisture (separated by the gauze) runs, so that by the heat radiating from the walls of said space or chamber, it is reëvaporated.

The improvements will now be described in detail by aid of the accompanying drawings, in which—

Figure 1:
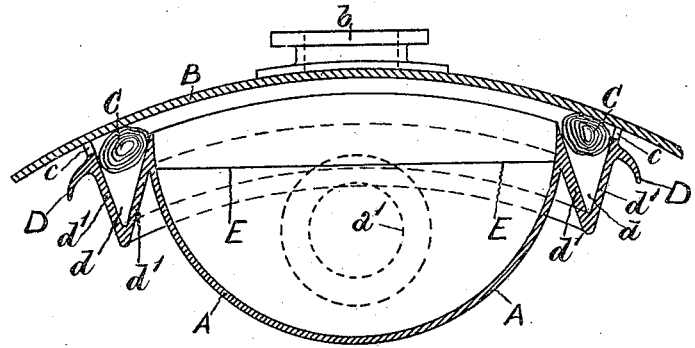
Figure 2:
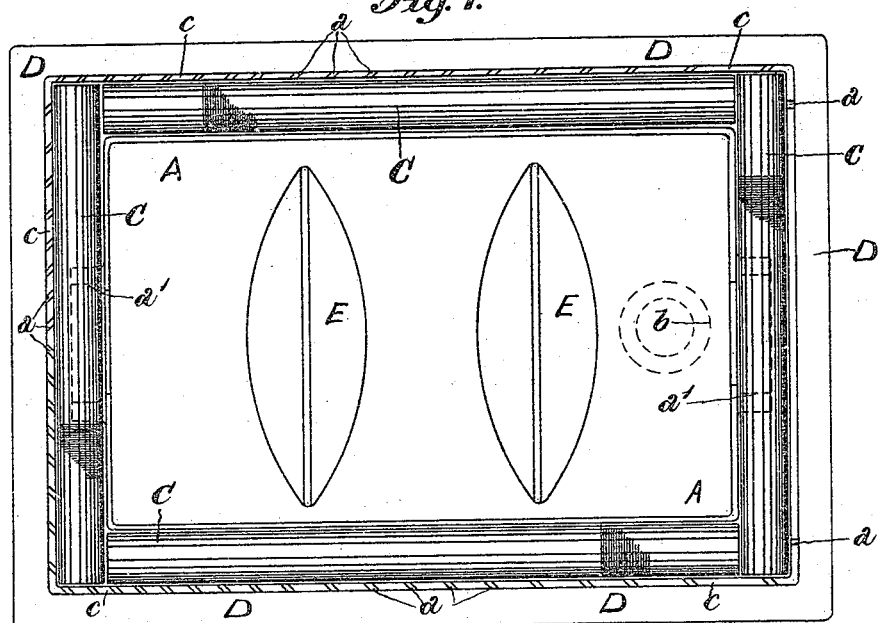
Figure 3:
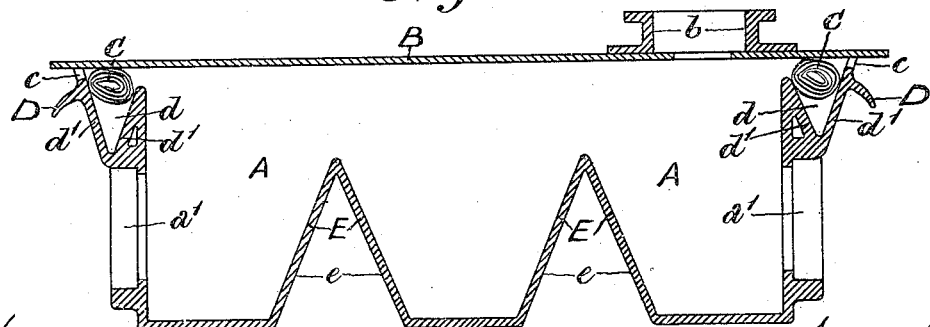

Figure 1 represents one form of the separating vessel in cross section. Fig. 2 represents it in plan, and Fig. 3 is a longitudinal section.

In the drawing A designates the vessel which in the construction shown is of rectangular shape and curved or rounded longitudinally at the bottom.

B represents the shell of the boiler or it may be the steam dome or drum of the boiler, of which $b$ represents the steam outlet. The upper edges $c$ of the vessel A which are in contact with the shell B of the boiler when the vessel is arranged in position, are constructed with graduated serrations, apertures or openings $a$ which form the inlets through which the steam passes from the steam space of the boiler to the interior of said vessel. These serrations, apertures or openings $a$, as shown in Fig. 2, are graduated or increased in number or area the farther they are removed from the steam outlet $b$.

The vessel A around its upper edges $c$ is constructed to form a chamber or space $d$ and in this space $d$ is located the piece or pieces, which are preferably in the form of a roll or coil as shown, of copper or other suitable wire gauze C. This roll C is of such dimensions that it touches the shell B at the top and both sides of the chamber or space $d$ so that the steam after it enters the apertures or openings $a$ must pass through the interstices of the gauze before entering the vessel A. The entrained moisture is separated from the steam as the latter passes through the interstices of the gauze, being deposited thereupon; it then drops off the gauze and falls into the chamber or space $d$ below, the sides $d^1$ of which serve as evaporating surfaces and reëvaporate the separated water.

The vessel A is shown constructed at each end with a branch $a^1$ for connecting it to similar vessels when a plurality are employed. The ends $a^1$ may be closed when one vessel only is employed, or one end be closed when the vessel forms the last of a series.

D represents the usual baffles or drip flanges provided along the outer edges of the vessel A at or in proximity to the top or boiler shell B.

E represents the reëntrant parts provided in the bottom of the vessel A for reëvaporating any water that may pass into it. These reëntrant parts E are as shown cored out in the casting or otherwise constructed hollow on the underside, so that the steam in the steam space of the boiler has direct contact with the outside surfaces $e$ of said reëntrant parts E. By constructing said reëntrant parts in this manner the area of the reëvaporating surface is also increased.

The portion of the vessel A which forms the chamber or space $d$ for the wire gauze C also serves as a baffle around the exterior of the vessel A.

What we claim as our invention and desire to protect by Letters Patent is:—

1. In means for separating water from steam in steam boilers a vessel located in the steam space of the boiler and constructed to form a chamber or space around its upper edge, wire gauze arranged in said space through which the steam must pass in its passage into the vessel on its way to the steam outlet, the walls of said chamber serving as reëvaporating surfaces for the separated water, and passages formed in the upper edges of the vessel around the gauze.

2. In means for separating water from steam in steam boilers a vessel located in the steam space of the boiler and constructed to form a chamber or space around its upper edge, wire gauze arranged in said space through which the steam must pass in its passage into the vessel on its way to the steam outlet, the walls of said chamber serving as reëvaporating surfaces for the separated water, and passages formed in the upper edges of the vessel around the gauze, the area of said passages being smaller nearer the steam outlet and larger the farther they are removed from said outlet.

3. In means for separating water from steam in steam boilers a vessel located in the steam space of the boiler and constructed to form a chamber or space around its upper edge, wire gauze arranged in said space through which the steam must pass in its passage into the vessel on its way to the steam outlet, the walls of said chamber serving as reëvaporating surfaces for the separated water, passages formed in the upper edges of the vessel around the gauze, the area of said passages being smaller nearer the steam outlet and larger the farther they are removed from said outlet, and external projections formed around the upper edges of the vessel beneath the steam inlet passages to form baffles or drip flanges, as set forth.

4. In means for separating water from steam in steam boilers a vessel located in the steam space of the boiler and having passages formed therein through which the steam passes on its way to the steam outlet, and wire gauze interposed in said passages, the vessel having reëvaporating fins or vanes made hollow on the underside so that the steam in the steam space of the boiler has direct contact with the outside of said fins or vanes, as set forth.

5. In means for separating water from steam in steam boilers a vessel located in the steam space of the boiler and constructed to form a chamber or space around its upper edge, wire gauze arranged in said space through which the steam must pass in its passage into the vessel on its way to the steam outlet, the walls of said chamber serving as reëvaporating surfaces for the separated water, and passages formed in the upper edges of the vessel around the gauze, the area of said passages being smaller nearer the steam outlet and larger the farther they are removed from said outlet, the vessel having reëvaporating fins or vanes made hollow on the underside so that the steam in the steam space of the boiler has direct contact with the outside of said fins or vanes, as set forth.

In witness whereof we have hereunto set our hands in the presence of two subscribing witnesses.

DAVID MILLS.
ARCHIBALD JOHN IRVINE.

Witnesses:
  CHAS. OVENDALE,
  R. OVENDALE.